US010511009B2

(12) United States Patent
Okuda et al.

(10) Patent No.: US 10,511,009 B2
(45) Date of Patent: *Dec. 17, 2019

(54) ELECTRICAL ENERGY STORAGE DEVICE

(71) Applicant: KABUSHIKI KAISHA TOYOTA JIDOSHOKKI, Kariya-shi, Aichi (JP)

(72) Inventors: Motoaki Okuda, Kariya (JP); Takayuki Hirose, Kariya (JP); Hiroyasu Nishihara, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 276 days.

This patent is subject to a terminal disclaimer.

(21) Appl. No.: 15/116,910

(22) PCT Filed: Jan. 28, 2015

(86) PCT No.: PCT/JP2015/052402
§ 371 (c)(1),
(2) Date: Aug. 5, 2016

(87) PCT Pub. No.: WO2015/119022
PCT Pub. Date: Aug. 13, 2015

(65) Prior Publication Data
US 2017/0170448 A1 Jun. 15, 2017

(30) Foreign Application Priority Data
Feb. 7, 2014 (JP) .................................. 2014-022055

(51) Int. Cl.
*H01M 2/34* (2006.01)
*H01M 10/0525* (2010.01)

(52) U.S. Cl.
CPC ....... *H01M 2/345* (2013.01); *H01M 10/0525* (2013.01); *H01M 2200/20* (2013.01)

(58) Field of Classification Search
CPC ..................................................... H01M 2/345
(Continued)

(56) References Cited

U.S. PATENT DOCUMENTS

2010/0323234 A1* 12/2010 Kim .................... H01M 2/206
429/158
2013/0196187 A1 8/2013 Yokoyama et al.
(Continued)

FOREIGN PATENT DOCUMENTS

JP 2003-86171 A 3/2003
JP 2012-38529 A 2/2012
(Continued)

OTHER PUBLICATIONS

English translation of Minamigata Atsushi, JP 2013218816 A, Oct. 2013, Japan.*
(Continued)

*Primary Examiner* — Cynthia H Kelly
*Assistant Examiner* — Rashid A Alam
(74) *Attorney, Agent, or Firm* — Sughrue Mion, PLLC

(57) ABSTRACT

An electrical energy storage device includes: a casing; a terminal; and an current interruption device. The terminal includes a column part inserted in the opening provided on the terminal wall of the casing and a base part disposed within the casing. An insulating member is disposed between the terminal and the terminal wall, the insulating member surrounds an entire periphery of the column part. The insulating member includes a sealing part sealing between the inside and the outside of the casing at a sealing position, and a non-sealing part. In an entire space provided between the terminal and the terminal wall on an inner side of the casing than the sealing position, the non-sealing part is disposed from an end face in the space on a casing outer side to an end face in the space on a casing inner side.

9 Claims, 6 Drawing Sheets

(58) Field of Classification Search
USPC .......................................................... 429/61
See application file for complete search history.

(56) References Cited

U.S. PATENT DOCUMENTS

2015/0079432 A1* 3/2015 Okuda .................. H01M 2/345
            429/61
2017/0163059 A1* 6/2017 Tamaru ................. H02J 7/0031

FOREIGN PATENT DOCUMENTS

| JP | 2013-157137 A | 8/2013 | | |
|---|---|---|---|---|
| JP | 2013-157200 A | 8/2013 | | |
| JP | 2013-171817 A | 9/2013 | | |
| JP | 2013-218816 A | 10/2013 | | |
| JP | 2013218816 A | * | 10/2013 | |
| JP | 2014-77674 A | 5/2014 | | |
| JP | 2014-116139 A | 6/2014 | | |
| JP | 2014-220052 A | 11/2014 | | |
| WO | WO-2013154166 A1 | * | 10/2013 | ............ H01M 2/345 |

OTHER PUBLICATIONS

International Search Report for PCT/JP2015/052402 dated Mar. 10, 2015.
Written Opinion for PCT/JP2015/052402 dated Mar. 10, 2015.
International Preliminary Report on Patentability dated Aug. 18, 2016 from the International Bureau in counterpart International Application No. PCT/JP2015/052402.

* cited by examiner

ELECTRICAL ENERGY STORAGE DEVICE

CROSS REFERENCE TO RELATED APPLICATIONS

This application is a National Stage of International Application No. PCT/JP2015/052402 filed Jan. 28, 2015, claiming priority based on Japanese Patent Application No. 2014-022055 filed Feb. 7, 2014, the contents of all of which are incorporated herein by reference in their entirety.

The technique disclosed in this description relates to an electrical energy storage device provided with a current interruption device.

BACKGROUND ART

In the technical field of electrical energy storage devices, a development of a current interruption device that interrupts current flowing between terminals (positive terminal and negative terminal) when an electrical energy storage device is overcharged or when a short circuit occurs therein is in progress. The current interruption device is disposed between the terminal and a collector (a positive collector or a negative collector). Japanese Patent Application Publication No. 2012-38529 discloses a current interruption device in which a conducting plate connected to a collector and a deformable plate connected to a terminal are bonded. When a pressure within the electrical energy storage device rises and exceeds a predetermined value, the current interruption device operates and the deformable plate separates away from the conducting plate. As a result of this, current between the terminal and the conducting plate is interrupted.

SUMMARY OF INVENTION

Technical Problem

In the electrical energy storage device of Japanese Patent Application Publication No. 2012-38529, the terminal is fixed to an opening provided on a terminal wall of a casing. A sealing member having an insulating property and an insulating member are disposed between the terminal and the terminal wall. The insulating member is disposed on a casing inner side than the sealing member, with a clearance from the sealing member. Due to this, a space is provided between the sealing member and the insulating member. In this space, the terminal and the terminal wall face each other directly. Here, there is a case where electrolytic solution within the casing enters into this space by flowing through the clearance between the insulating member and the terminal and/or the terminal wall. If a high voltage is applied between the terminal and the terminal wall after the current interruption device had operated in a state where the space is filled with the electrolytic solution, there is a possibility that the terminal and the terminal wall may become short circuited by the electrolytic solution filled in the space. Especially, in an electrical energy storage device module in which a plurality of electrical energy storage devices is connected in series, an extremely high voltage is applied between the terminal and the terminal wall when one current interruption device operates, thus the possibility of short circuit between the terminal and the terminal wall becomes higher.

In the present teachings, a technique that can suppress a terminal and a terminal wall from short circuiting is provided.

Solution to Technical Problem

An electrical energy storage device disclosed herein comprise a casing, a terminal and a current interruption device. The casing configures to accommodate electrolytic solution and an electrode assembly including a positive electrode and a negative electrode. The terminal configures to extend from inside of the casing to outside of the casing through an opening provided on the casing. The current interruption device is disposed within the casing, electrically connected to the terminal and one of the positive electrode and the negative electrode, and comprising a conductive member configured to switch the terminal and the one of the positive electrode and the negative electrode from a conductive state to a non-conductive state. The terminal is provided on a terminal wall, which is one of a plurality of walls configuring the casing. The terminal comprises a column part inserted in the opening and a base part connected to one end of the column part and disposed within the casing. The base part is larger than the opening in a plan view of the terminal wall and is electrically connected to the conductive member. An insulating member is disposed between the terminal and the terminal wall, the insulating member has an insulating property and surrounds an entire periphery of the column part. The insulating member comprises a sealing part sealing between the inside and the outside of the casing by being in contact with both of the terminal and the terminal wall at a sealing position, and a non-sealing part that does not provide sealing between the inside and the outside of the casing. The sealing position surrounds the entire periphery of the column part. In a first space provided between the terminal and the terminal wall on an inner side of the casing than the sealing position, the non-sealing part surrounds the entire periphery of the column part and is disposed from an end face in the first space on a casing outer side to an end face in the first space on a casing inner side.

In the above electrical energy storage device, the space between the terminal and the terminal wall is sealed at the sealing position. Due to this, the electrolytic solution in the casing is suppressed from leaking out to a space on a casing outer side than the sealing position. Further, in the above electrical energy storage device, the non-sealing part surrounds the entire periphery of the column part in the first space, and it is disposed from the end face in the first space on the casing outer side to the end face on the casing inner side. Due to this, the terminal and the terminal wall do not face each other directly in the first space. Thus, even if a high voltage is applied between the terminal and the terminal wall after the current interruption device has operated, the terminal and the terminal wall can be suppressed from short circuiting.

The details and further improvements of the technique disclosed in this teachings will be described in further detail in the description of embodiments and examples.

DESCRIPTION OF EMBODIMENTS

Figure 1:
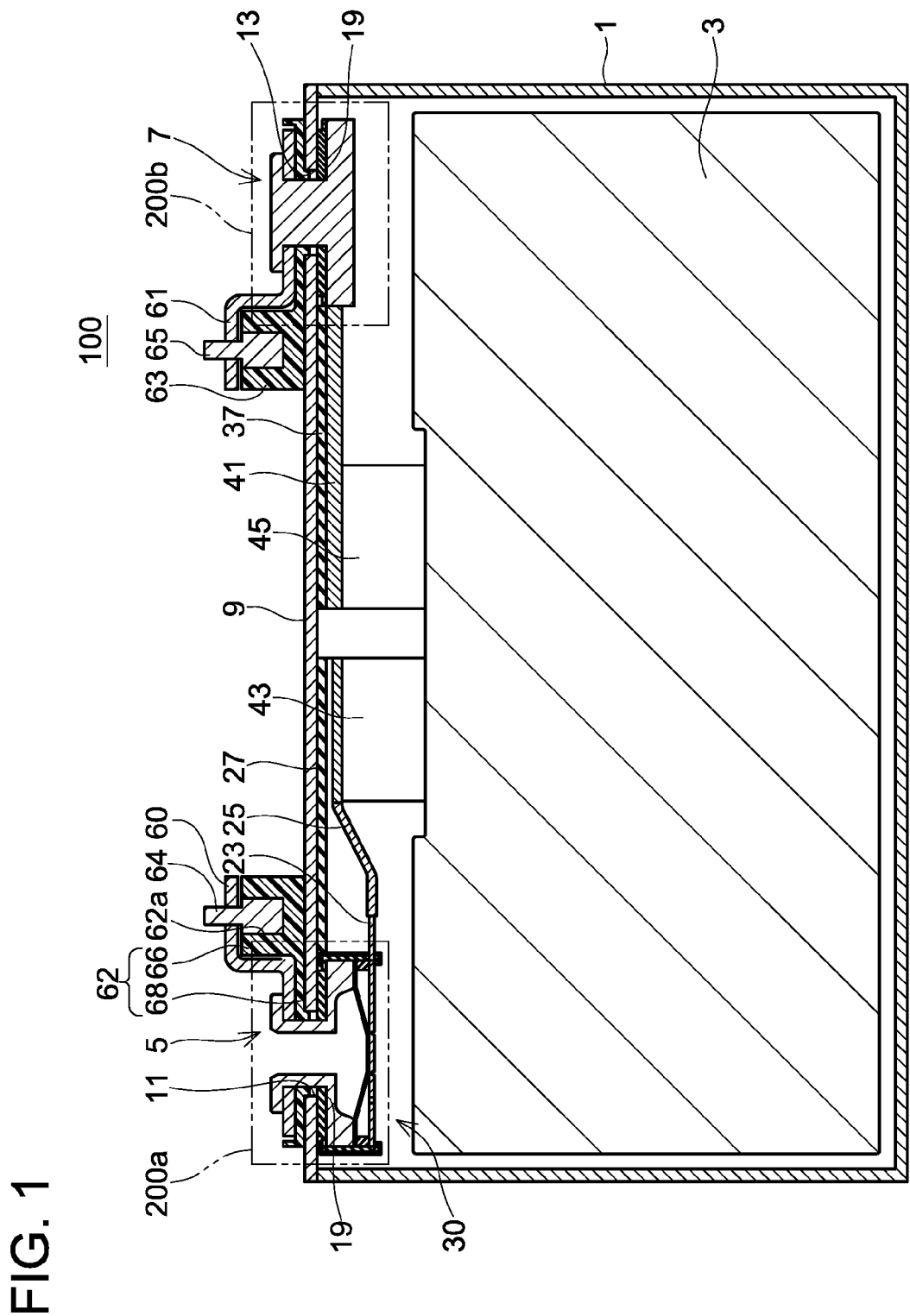
FIG. 1 is a vertical cross sectional view of an electrical energy storage device of a first embodiment.

Primary features of embodiments described hereinbelow will be listed. Notably, the technical features described hereinbelow are technical elements independent from one another, and exhibit technical usefulness solely or in various combinations, thus are not limited to the combinations described in the claims as originally filed.

An electrical energy storage device disclosed herein may comprise: a casing; a terminal; and a current interruption device. The casing may be configured to accommodate electrolytic solution and an electrode assembly including a positive electrode and a negative electrode. The terminal may be configured to extend from inside of the casing to outside of the casing through an opening provided on the casing. The current interruption device may be disposed within the casing, electrically connected to the terminal and one of the positive electrode and the negative electrode, and comprise a conductive member configured to switch the terminal and the one of the positive electrode and the negative electrode from a conductive state to a non-conductive state. The terminal may comprise a column part inserted in the opening and a base part connected to one end of the column part and disposed within the casing. The base part is larger than the opening in a plan view of the terminal wall and is electrically connected to the conductive member. A sealing member having an insulating property may be disposed between the inside and the outside of the casing by being in contact with both of the terminal and the terminal wall at a sealing position, and surrounds an entire periphery of the column part. According to this configuration, the electrolytic solution can be suppressed from entering to the space between the terminal and the terminal wall. Due to this, the terminal and the terminal wall can be suppressed from becoming short circuited.

In an electrical energy storage device disclosed herein, the terminal may comprise a fixed pert connected to the column part at an opposite side of a side connected to the base part of the column part, disposed in the outside of the casing, and fixing the terminal to the terminal wall by bending outward in a direction perpendicular to an axis from the opposite side of the column part. According to this configuration, a direction of load applied by the fixed part onto the terminal wall upon fixing the terminal on the terminal wall and a direction of compressing force for sealing the terminal and the terminal wall match, thus strong sealing can be provided between the terminal and the terminal wall at the sealing position.

In an electrical energy storage device disclosed herein, the terminal may be fixed and clamped to the terminal wall by a nut disposed on the outside of the casing. The sealing position may be disposed in a range where the terminal and the terminal wall overlap, and that is occupied by the nut in the plan view of the terminal wall. According to this configuration, a direction of tightening force applied by the nut onto the terminal wall upon fixing the terminal on the terminal wall by tightening and the direction of the compressing force for sealing the terminal and the terminal wall match, thus strong sealing can be provided between the terminal and the terminal wall at the sealing position.

Further, an electrical energy storage device module disclosed herein may comprise a plurality of the electrical energy storage devices described above, the electrical energy storage devices being connected in series. This electrical energy storage device module is configured so that the terminal and the terminal wall do not face each other directly in the aforementioned space by providing the insulating member or the sealing member in the space between the terminal and the terminal wall in each of the electrical energy storage device configuring the electrical energy storage device module. Due to this, even if a high voltage is applied between the terminal and the terminal wall after the current interruption device had operated, the terminal and the terminal wall can be suppressed from becoming short circuited.

First Embodiment

An electrical energy storage device 100 of a first embodiment will be described with reference to FIGS. 1 to 3. The electrical energy storage device 100 is a lithium ion secondary battery, which is one type of secondary batteries. As shown in FIG. 1, the electrical energy storage device 100 comprises a casing 1, an electrode assembly 3, rivet terminals 5, 7, and a current interruption device 30. The casing 1 is made of metal, and has a substantially rectangular solid shape. The electrode assembly 3 and the current interruption device 30 are accommodated inside the casing 1. The electrode assembly 3 comprises a negative electrode and a positive electrode. A negative collector tab 43 is fixed on the negative electrode, and a positive collector tab 45 is fixed on the positive electrode. The inside of the casing 1 is filled with electrolytic solution, and air is removed from therewithin. The detailed description of the negative electrode and the positive electrode will be omitted. Notably, the rivet terminals 5, 7 correspond to examples of "a terminal".

Openings 11, 13 are provided on an upper wall of the casing 1. Hereinbelow, the upper wall of the casing 1 may specifically be termed an upper wall 9. The rivet terminal 5 extends from inside to outside of the casing 1 through the opening 11, and the rivet terminal 7 extends from the inside to the outside of the casing 1 through the opening 13. That is, both the rivet terminal 5 and the rivet terminal 7 are disposed in a same direction with respect to the electrode assembly 3. External terminals 60, 61 for external connections and bolts 64, 65 are disposed outside the casing 1 (to be described later). The rivet terminal 5, the external terminal 60, and the bolt 64 are electrically connected to each other, and configure a negative terminal. Similarly, the rivet terminal 7, the external terminal 61, and the bolt 65 are electrically connected to each other, and configure a positive terminal. A lower end of the rivet terminal 5 is positioned within the casing 1, and is connected to the current interruption device 30 (to be described later). The current interruption device 30 is connected to the negative collector tab 43 via a connecting terminal 23 and a negative lead 25. The negative lead 25 is insulated from the casing upper wall 9 by an insulating sheet 27. On the other hand, a lower end of the rivet terminal 7 is positioned within the casing 1, and is connected to the positive collector tab 45 via a positive lead 41. The positive lead 41 is insulated from the casing upper wall 9 by an insulating sheet 37. Notably, the casing upper wall 9 corresponds to an example of "a terminal wall".

Resin gaskets 62, 63 are disposed on an upper surface of the casing upper wall 9. The gasket 62 comprises a protrusion part 66 protruding upward from the casing upper wall 9 and a flat plate part 68 extending along the casing upper wall 9. The protrusion part 66 is disposed on a center side of the casing upper wall 9, and the flat plate part 68 is disposed on an opening 11 side of the casing upper wall 9. The external terminal 60 is disposed on an upper surface of the gasket 62. The external terminal 60 has a shape complying with a shape of the upper surface of the gasket 62. The external terminal 60 is disposed along the upper surface of the gasket 62. The protrusion part 66 of the gasket 62 includes a bottomed hole 62a. A head of the bolt 64 is disposed in the hole 62a. A shaft of the bolt 64 protrudes upward through an opening of the external terminal 60. The external terminal 60 and the gasket 62 are attached to the casing upper wall 9 by the rivet terminal 5 (to be described later). Configurations of the gasket 63, the external terminal 61, and the bolt 65 are identical to the configurations of the gasket 62, the external terminal 60, and the bolt 64 as aforementioned, thus the description thereof will be omitted.

Here, the rivet terminal 5 will be described with reference to FIG. 2. FIG. 2 shows an enlarged view of a two-dot chain line portion 200a of FIG. 1. The rivet terminal 5 comprises a cylindrical part 14, a base part 15, and a fixed part 16. The cylindrical part 14 has a cylinder shape, and penetrates through the opening 11. Due to this, an upper portion of the cylindrical part 14 is positioned outside the casing 1, and a lower portion thereof is positioned inside the casing 1. A through hole 14a is provided in the cylindrical part 14 in an axial direction (up and down direction). Due to this, inside of the through hole 14a is kept at an atmospheric pressure.

The base part 15 has a disk shape, and is connected to a lower end of the cylindrical part 14. That is, the base part 15 is positioned inside the casing 1. The base part 15 is provided in a ring shape, and is connected to the cylindrical part 14 so as to be substantially perpendicular to the axial direction of the cylindrical part 14. An outer diameter of the base part 15 is made larger than an outer diameter of the cylindrical part 14. The cylindrical part 14 and the base part 15 are arranged concentric. An outer edge of a lower surface of the base part 15 is connected to an outer edge of a deformable plate 32 (to be described later) of the current interruption device 30. A recess 15a is provided at a center of the lower surface of the base part 15. The recess 15a is provided so as to prevent an inverted portion of the deformable plate 32 from making contact with the base part 15 when the deformable plate 32 is inverted upward. Since a center of the recess 15a and the through hole 14a are communicated, inside of the recess 15a is also kept at the atmospheric pressure. Notably, the shape of the base part 15 is not limited to the disk shape, and may for example be a rectangular shape. In this case, the base part 15 simply needs to be made larger than the cylindrical part 14. The same applies to a base part 95 to be described later. Notably, the deformable plate 32 corresponds to an example of "a conductive member".

The fixed part 16 has a ring shape, and is connected to an upper end of the cylindrical part 14. That is, the fixed part 16 is positioned outside the casing 1. The rivet terminal 5 is fixed to the casing upper wall 9 by the fixed pert 16. Before the rivet terminal 5 is fixed to the casing upper wall 9, the fixed pert 16 extends along the axial direction of the cylindrical part 14. That is, the cylindrical part 14 and the fixed part 16 configure one cylindrical part extending in the axial direction. In order to simplify the explanation hereinbelow, the cylindrical part as aforementioned will be termed "a cylindrical part"

When the rivet terminal 5 is to be fixed to the casing upper wall 9, the cylindrical part is inserted into the opening of the gasket 62 and the opening of the external terminal 60 from within the casing 1 in a state where the gasket 62 and the external terminal 60 are attached to the opening 11 of the casing upper wall 9. Thereafter, an upper end of the cylindrical part (portion protruding to the outside of the casing 1) is bent outward in a radial direction (perpendicular direction with respect to the axis) so that the cylinder part is press expanded in the radial direction. Due to this, the cylindrical part makes contact with the upper surface of the external terminal 60, and the rivet terminal 5 is fixed by being riveted to the casing upper wall 9. The cylindrical part (that is, the bent portion of the cylindrical part) corresponds to the fixed part 16. By fixing the rivet terminal 5 to the casing upper wall 9, a sealing member 19 (to be described later), the gasket 62, and the external terminal 60 are clamped between the rivet terminal 5 and the casing upper wall 9. At this occasion, the casing upper wall 9, the base part 15, and the fixed part 16 are substantially parallel to each other. An insulation between the external terminal 60 and the casing upper wall 9 is ensured by the gasket 62. Notably, it should be noted that "bent outward in a radial direction (perpendicular direction with respect to the axis)" refers to a direction for bending the cylindrical part of the rivet terminal 5, and does not refer to a direction of the fixed part 16 after having fixed the rivet terminal 5 to the casing upper wall 9.

A portion 68a extending downward is provided on an outer periphery of the opening provided in the flat plate part 68 of the gasket 62. The portion 68a is fitted into the opening 11. The rivet terminal 5 and the casing upper wall 9 are more surely insulated by the portion 68a, and the gasket 62 can easily be positioned.

Next, with reference to FIG. 2, a positional relationship of the members disposed between the rivet terminal 5 and the casing upper wall 9 will be described. A ring-shaped (that is, in a shape surrounding an entire periphery of the cylindrical part 14) and insulating sealing member 19 is disposed between the rivet terminal 5 and the casing upper wall 9. Polytetrafluoroethylene (PFA) is used as the sealing member 19. Notably, a material of the sealing member 19 is not limited hereto, and it simply needs to be a material having suitable liquid resistance to electrolytic solution, such as ethylene-propylene based rubber (EPM). The sealing member 19 makes contact with both the base part 15 and the casing upper wall 9 in a range shown by a bold line in FIG. 2. Due to this, the sealing member 19 seals between the rivet terminal 5 and the casing upper wall 9. On the other hand, the sealing member 19 on a casing inner side (which in other words is the sealing member 19 disposed on an outer periphery of the upper surface of the base part 15) has a thin thickness in the up and down direction (thus this portion may hereinbelow be termed "a thin portion"). Due to this, the thin portion 19a of the sealing member 19 does not provide sealing between the rivet terminal 5 and the casing upper wall 9. Hereinbelow, the portion where the sealing member 19 provides sealing between the rivet terminal 5 and the casing upper wall 9 will be termed "a sealing portion S1". The sealing portion S1 surrounds the outer periphery of the cylindrical part 14. Notably, since the sealing member 19 is made of insulating material, the insulation between the rivet terminal 5 and the casing upper wall 9 is maintained. Notably, the sealing member 19 corresponds to an example of "an insulating member", and the sealing portion S1 corresponds to an example of "a sealing position", and the thin portion 19a corresponds to an example of "a non-sealing part".

Figure 2:
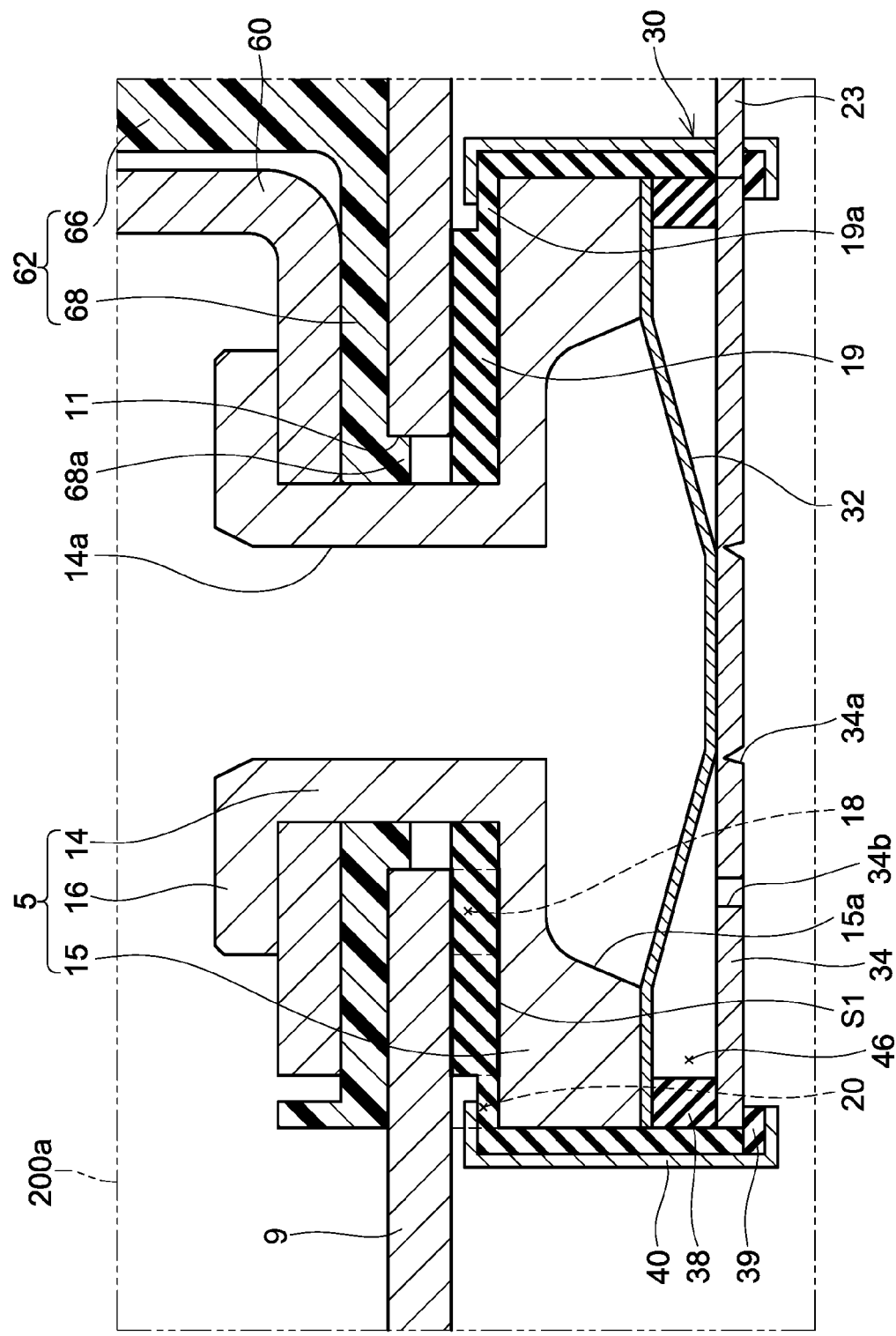
FIG. 2 is a partial enlarged view in a vicinity of a rivet terminal configuring a negative terminal of FIG. 1.
Figure 3:
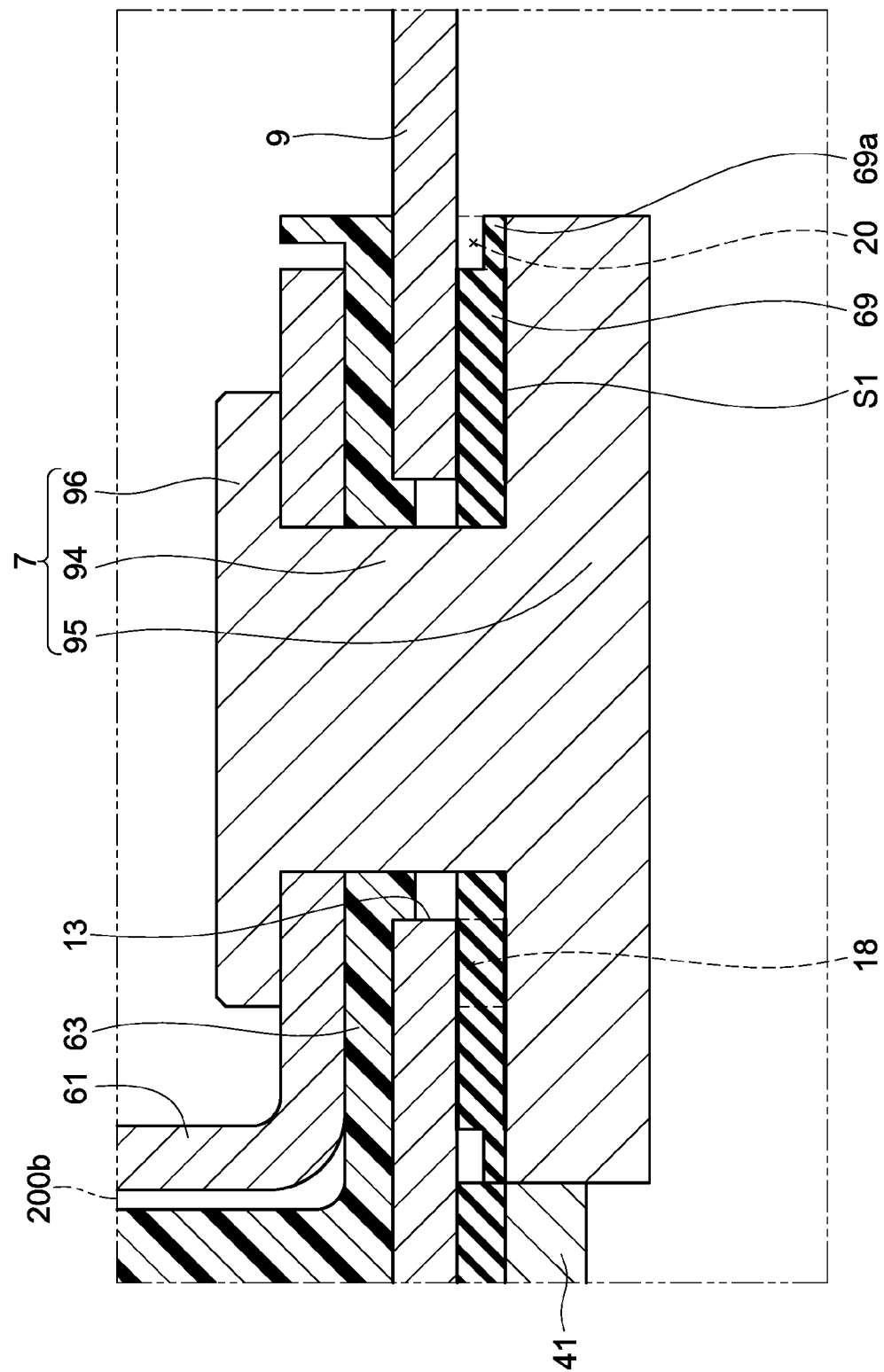
FIG. 3 is a partial enlarged view in a vicinity of a rivet terminal configuring a positive terminal of FIG. 1.

A space 18 surrounded by a dotted line of FIG. 2 shows a space in a range occupied by the fixed part 16 within a range where the casing upper wall 9 and the base part 15 face each other when the casing upper wall 9 is seen in a plan view. The space 18 is provided to surround an outer periphery of the cylindrical part 14. As shown in FIG. 2, a part of the sealing portion S1 on a casing outer side is positioned within the space 18.

Within a space between the rivet terminal 5 and the casing upper wall 9, a space 20 is provided on a casing inner side than the sealing portion S1. The space 20 is provided to surround the outer periphery of the cylindrical part 14. The space 20 communicates with inside of the casing 1. The thin portion 19a extends on the upper surface of the base part 15 from an inner peripheral surface of the space 20 toward a radially outer side, covers an outer peripheral surface of the base part 15, and extends to substantially the same height as a breakable plate 34 (to be described later). Due to this, the thin portion 19a is disposed over an entire periphery of the space 20 and from the inner peripheral surface to an outer peripheral surface of the space 20. In other words, the thin portion 19a is disposed over an entirety of the space 20 in a planar direction (direction perpendicular to the up and down direction). Notably, there may be a space where the thin portion 19a does not exist in the up and down direction of the space 20.

An end face of the sealing member 19 (more specifically, the thin portion 19a) on the casing inner side makes contact with an insulating member 39. The insulating member 39 covers an outer edge of a lower surface of the breakable plate 34 along a peripheral direction. A ring-shaped metal plate member 40 is disposed on an outer peripheral side of the thin portion 19a of the sealing member 19 and the insulating member 39. Specifically, after having disposed the sealing member 19 and the insulating member 39 at the aforementioned positions and fixed the base part 15, the deformable plate 32, and the breakable plate 34 in a radial direction, an upper end and a lower end of the plate member 40 are riveted to outer peripheral surfaces of the thin portion 19a of the sealing member 19 and the insulating member 39. Due to these, the base part 15, the deformable plate 32, and the breakable plate 34 are clamped in the up and down direction. By thinning the thickness of the sealing member 19 on the casing inner side so as to form a space between the sealing member 19 and the casing upper wall 9, the plate member 40 can be disposed on an upper surface of the thin portion 19a by making use of this space. Due to this, the plate member 40 can easily fix the base part 15, the deformable plate 32, and the breakable plate 34 by riveting.

Next, a positional relationship of the rivet terminal 7 and members disposed between the rivet terminal 7 and the casing upper wall 9 will be described with reference to FIG. 3. FIG. 3 shows an enlarged view of a two-dot chain line portion 200b of FIG. 1. Description will be omitted for configurations similar to FIG. 2, and differing points will be described. The rivet terminal 7 comprises a column part 94, a base part 95, and a fixed part 96. The rivet terminal 7 has a solid volume, and does not have any through hole nor recess provided therein. By bending the fixed part 96 radially outward as shown in FIG. 3, the rivet terminal 7 is fixed to the casing upper wall 9 by riveting. Due to this, the sealing member 69, the gasket 63, and the external terminal 61 are clamped between the rivet terminal 7 and the casing upper wall 9. At this occasion, the casing upper wall 9, the base part 95, and the fixed part 96 are parallel to each other. The base part 95 is connected to the positive lead 41. Notably, the rivet terminal 7 is not limited to a solid volume member, and may have a through hole provided in the column part 94.

The sealing member 69 makes contact with both the base part 95 and the casing upper wall 9 in the sealing portion S1, and seals between these members. A surface of the sealing member 69 on the casing outer side (that is, an inner peripheral surface thereof) makes contact with the column part 94. The sealing member 69 on the casing inner side has a thin thickness in the up and down direction (hereinbelow, this portion will be termed a "thin portion 69a"). The thin portion 69a extends over an entire upper surface of the base part 95 radially outward to a position of an outer peripheral surface of the base part 95. Due to this, when the casing upper wall 9 is seen in the plan view, the thin portion 69a of the sealing member 69 will always be located within the space 20. Further, a part of the sealing portion S1 on the casing outer side is positioned within the space 18.

Returning to FIG. 2, the current interruption device 30 will be described. The current interruption device 30 comprises a metal deformable plate 32 and a metal breakable plate 34. The current interruption device 30 is positioned under the rivet terminal 5, but is not positioned under the bolt 64. An outer edge of the deformable plate 32 is connected to the outer edge of the base part 15, and a lower end of the recess 15a of the base part 15 is covered by the deformable plate 32. Since the recess 15a is kept at the atmospheric pressure, the atmospheric pressure acts on an upper surface of the deformable plate 32. The base part 15, the deformable plate 32, and the breakable plate 34 are clamped by the ring-shaped sealing member 19, insulating member 39, and plate member 40. The deformable plate 32 is a conductive diaphragm having a circular shape when seen in the plan view, and is bulged out downward. A center of the deformable plate 32 is connected to the breakable plate 34. The breakable plate 34 is a circular plate member, and is positioned under the deformable plate 32. The connecting terminal 23 is connected to a part of an outer edge of the breakable plate 34. A groove portion 34a is provided at the center of a lower surface of the breakable plate 34. The groove portion 34a has a circular shape when the breakable plate 34 is seen in its bottom surface view. The breakable plate 34 and the center of the deformable plate 32 are connected on an inner side of the groove portion 34a. By having the groove portion 34a provided, a mechanical strength of the breakable plate 34 at the position where the groove portion 34a is formed becomes weaker than a mechanical strength of the breakable plate 34 at positions other than the groove portion 34a. A ventilation hole 34b is provided at a part of the breakable plate 34, and a space 46 between the deformable plate 32 and the breakable plate 34 communicates with the space inside the casing 1. Further, a ring-shaped insulating member 38 is disposed between the outer edge of the deformable plate 32 and the outer edge of the breakable plate 34.

The current interruption device 30 comprises a current passage that connects in series the connecting terminal 23, the breakable plate 34, the deformable plate 32, and the rivet terminal 5. Due to this, the electrode assembly 3 and the rivet terminal 5 are electrically connected via the current passage of the current interruption device 30.

Here, an interrupting operation of the current interruption device 30 will be described. In the electrical energy storage device 100, the rivet terminal 5 and the negative collector tab 43 (negative electrode) are configured conductive and the rivet terminal 7 and the positive collector tab 45 (positive electrode) are configured conductive. Due to this, the rivet terminal 5 and the rivet terminal 7 are in a state where current is capable of flowing therethrough. Since the space inside the casing 1 and the space 46 are communicated through the ventilation hole 34b, when the pressure inside the casing 1 rises, a pressure acting on the lower surface of the deformable plate 32 rises. On the other hand, the atmospheric pressure acts on the upper surface of the deformable plate 32. Due to this, when a difference between the pressures acting respectively on the lower surface and the upper surface of the deformable plate 32 reaches a certain value (which in other words when the pressure inside the casing 1 exceeds a certain value), the deformable plate 32 inverts and changes from a state of bulging out downward to a state of bulging out upward. When this happens, the breakable plate 34 that had been connected to the center of the deformable plate 32 breaks in accordance with the change in the deformable plate 32 from the groove portion 34a that is mechanically weak. Then, the breakable plate 34 is separated into a portion that was surrounded by the groove portion 34a and an outer peripheral portion of the groove portion 34a. Due to this, the current passage connecting the breakable plate 34 and the deformable plate 32 is interrupted, and the current flow between the electrode assembly 3 and the rivet terminal 5 is interrupted. At this occasion, the deformable plate 32 is insulated from the connecting terminal 23, and the breakable plate 34 is insulated from the rivet terminal 5.

An effect of the electrical energy storage device 100 of the first embodiment will be described. Hereinbelow, unless otherwise described, the "rivet terminal 5" can be replaced with the "rivet terminal 7". The same applies to effects in other embodiments. In the aforementioned electrical energy storage device 100, the space between the rivet terminal 5 and the casing upper wall 9 is sealed at the sealing portion S1 of the sealing member 19. Due to this, the electrolytic solution inside the casing 1 is suppressed from leaking out to the space on the outer side than the sealing portion S1. Further, in the space 20, the thin portion 19a of the sealing member 19 is disposed over the entirety of this space in the planar direction. Due to this, the rivet terminal 5 and the casing upper wall 9 do not face each other directly in the space 20. Thus, even if the electrolytic solution enters into the space 20, the rivet terminal 5 and the casing upper wall 9 are suppressed from making contact via the electrolytic solution. As a result, the rivet terminal 5 and the casing upper wall 9 can be suppressed from short circuiting even when a high voltage is applied between the rivet terminal 5 and the casing upper wall 9 in a state where the electrolytic solution is present in the space 20 after the current interruption device 30 had operated. Notably, although the plate member 40 and the casing upper wall 9 face each other directly, the plate member 40 does not serve as a current passage and is insulated from the current passage. Due to this, it should be noted that there will be no problem occurring even if the plate member 40 is electrically conducted via the casing upper wall 9 and the electrolytic solution after the current interruption device 30 had operated.

Further, in the above electrical energy storage device 100, a part of the sealing portion S1 is positioned in the space 18. That is, a part of the sealing portion S1 is positioned in a range occupied by the fixed part 16 within a range where the rivet terminal 5 and the casing upper wall 9 face each other when the casing upper wall 9 is seen in the plan view. Due to this, a direction of load applied by the fixed part 16 onto the casing upper wall 9 and a direction of compressing force for sealing the rivet terminal 5 and the casing upper wall 9 match, thus strong sealing can be provided between the rivet terminal 5 and the casing upper wall 9 at the sealing position S1. Moreover, by configuring to provide just one member between the casing upper wall 9 and the rivet terminal 5, a number of components of the electrical energy storage device can be reduced, and manufacturing efficiency is improved.

Notably, in an electrical energy storage device module that comprises a plurality of electrical energy storage devices 100, the electrical energy storage devices 100 are connected in series, and are connected in serial until a desired voltage is obtained. Due to this, a high power and large capacity electrical energy storage device module can be facilitated.

Second Embodiment

Next, a second embodiment will be described with reference to FIG. 4. Hereinbelow, description will be given only for points different from the first embodiment, and the description will be omitted for configurations similar to the first embodiment. The same applies to other embodiments and variants.

Figure 4:
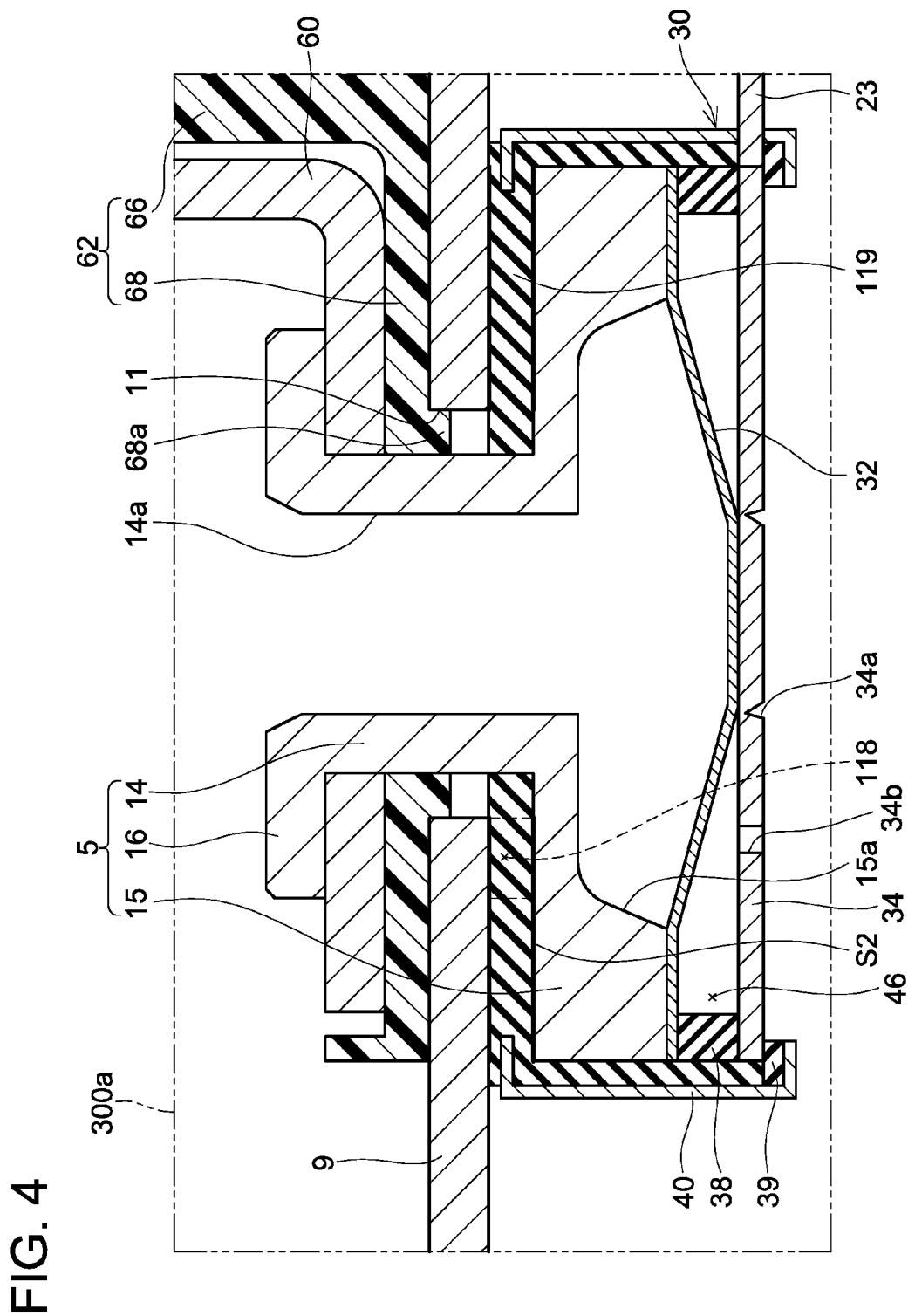
FIG. 4 is a partial enlarged view in a vicinity of a rivet terminal configuring a negative terminal of an electrical energy storage device of a second embodiment.

A two-dot chain line portion 300a of FIG. 4 corresponds to the two-dot chain line portion 200a of FIG. 1. A sealing member 119 is disposed between the base part 15 and the casing upper wall 9. The sealing member 119 is disposed over an entire upper surface of the base part 15. The sealing member 119 makes contact with both the base part 15 and the casing upper wall 9 at a sealing part S2. A thickness of the sealing member 119 is constant in the space where the base part 15 and the casing upper wall 9 face each other Due to this, the sealing part S2 extends to the outer peripheral surface of the base part 15. In other words, the sealing part S2 extends to the end surface on the casing inner side in the space between the base part 15 and the casing upper wall 9. The sealing member 119 and the plate member 40 are integrated by insert molding. A space 118 surrounded by a dotted line of FIG. 4 shows a space in the range occupied by the fixed part 16 within the range where the casing upper wall 9 and the base part 15 face each other when the casing upper wall 9 is seen in the plan view. As shown in FIG. 4, a part of the sealing part S2 on the casing outer side is positioned within the space 118. Notably, the sealing part S2 corresponds to an example of "a sealing position".

In this configuration, the sealing part S2 extends to the outer peripheral surface of the base part 15. Due to this, the electrolytic solution is suppressed from entering into the space between the casing upper wall 9 and the base part 15. According to this configuration as well, the same effects as the electrical energy storage device 100 of the first embodiment can be achieved.

Third Embodiment

Figure 5:
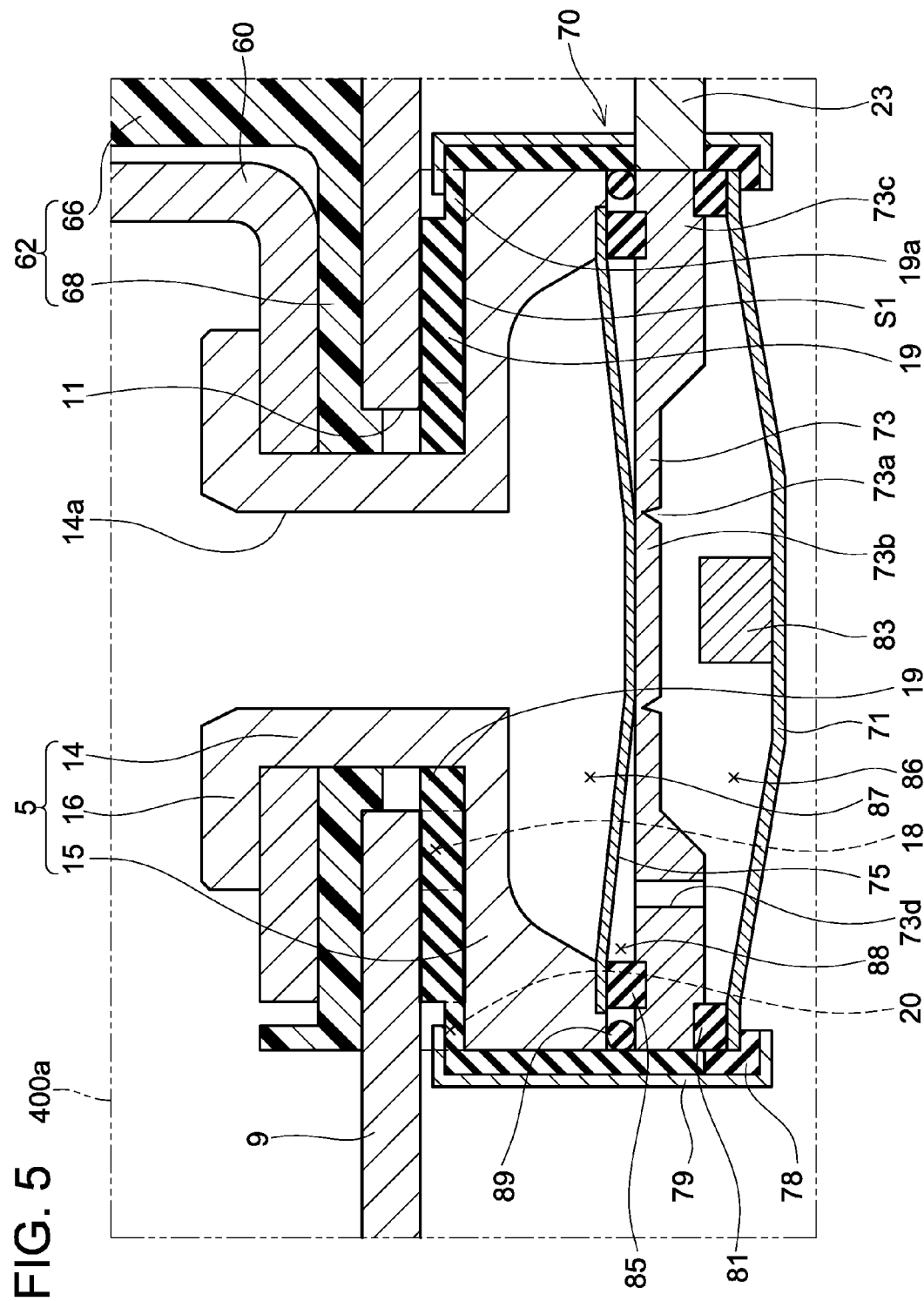
FIG. 5 is a partial enlarged view in a vicinity of a rivet terminal configuring a negative terminal of an electrical energy storage device of a third embodiment.

A two-dot chain line portion 400a of FIG. 5 corresponds to the two-dot chain line portion 200a of FIG. 1. In this electrical energy storage device, the configuration of the current interruption device differs from the first embodiment, and other configurations are the same as the first embodiment. A current interruption device 70 comprises a metal first deformable plate 75, a metal breakable plate 73 and a metal second deformable plate 71. The base part 15, the first deformable plate 75, the breakable plate 73, and the second deformable plate 71 are supported by a sealing member 19 and an insulating member 78 that have an insulating property. A metal plate member 79 is riveted to outer peripheral surfaces of the sealing member 19 and the insulating member 78. Due to this, the base part 15, the first deformable plate 75, the breakable plate 73, and the second deformable plate 71 are clamped in the up and down direction. Notably, the first deformable plate 75 corresponds to an example of "a conductive member".

The second deformable plate 71 is disposed under the breakable plate 73. The second deformable plate 71 is a circular plate member, and has its center bulged out downward. An insulating member 81 is disposed on an outer edge of an upper surface of the second deformable plate 71. The insulating member 81 is a ring-shaped member, and insulates the second deformable plate 71 and the breakable plate 73. Further, a protrusion part 83 is provided on the upper surface of the second deformable plate 71. The protrusion part 83 is positioned at the center of the second deformable plate 71. The protrusion part 83 protrudes upward toward the breakable plate 73. A center part 73b of the breakable plate 73 (portion surrounded by a groove portion 73a) is positioned above the protrusion part 83. When the breakable plate 73 and the protrusion part 83 are seen in their bottom surface view, an outer periphery of the protrusion part 83 is made smaller than an outer periphery of the center part 73b. The pressure in the space inside the casing 1 acts on a lower surface of the second deformable plate 71. A pressure in a space 86 between the second deformable plate 71 and the breakable plate 73 acts on an upper surface of the second deformable plate 71 (to be described later). The space 86 is sealed from the space inside the casing 1. Thus, when the pressure in the space inside the casing 1 becomes high, the pressures acting on the upper surface and the lower surface of the second deformable plate 71 become different.

The breakable plate 73 is disposed between the second deformable plate 71 and the first deformable plate 75. The breakable plate 73 is defined by the groove portion 73a into the center part 73b surrounded by the groove portion 73a and an outer peripheral part 73c positioned on the outer peripheral side of the groove portion 73a. A plate thickness of the center part 73b is made thin and a plate thickness of the outer peripheral part 73c is made thick. A ventilation hole 73d is provided in the breakable plate 73. The space 48 communicates with a space 88 between the first deformable plate 75 and the breakable plate 73 via the ventilation hole 73d.

The first deformable plate 75 is a circular plate member, and is disposed above the breakable plate 73. The first deformable plate 75 has substantially the same configuration as the deformable plate 32 of the first embodiment. An outer edge of the first deformable plate 75 is connected to the base part 15 of the rivet terminal 5. An insulating member 85 is disposed between the first deformable plate 75 and the breakable plate 73. The insulating member 85 is a ring-shaped member, and makes contact with the outer edge of the first deformable plate 75 and the outer edge of the breakable plate 73. A space 87 is provided between an upper surface of the first deformable plate 75 and a lower surface of the base part 15 (wall inside the recess 15a). The space 87 communicates with the through hole 14a provided in the rivet terminal 5, and is kept at the atmospheric pressure. A sealing member 89 is disposed between the breakable plate 73 and the outer edge of the base part 15. The sealing member 89 is a ring-shaped member, and is disposed on the outer side of the insulating member 85. The sealing member 89 makes contact with the lower surface of the base part 15 and the upper surface of the breakable plate 73, and surrounds an entire periphery of the base part 15 and the breakable plate 73 along the outer edges thereof. The sealing member 89 seals the space between the base part 15 and the breakable plate 73.

A current passage of the current interruption device 70 will be described. In the current interruption device 70 shown in FIG. 5, the breakable plate 73 is connected to the center part of the first deformable plate 75. The outer edge of the first deformable plate 75 is connected to the rivet terminal 5. Thus, the current interruption device 70 comprises the current passage connecting in series the connecting terminal 23, the breakable plate 73, the first deformable plate 75, and the rivet terminal 5. Due to this, the electrode assembly 3 and the rivet terminal 5 are electrically connected through the current passage of the current interruption device 70.

Here, an interrupting operation of the current interruption device 70 will be described with reference to FIG. 5. In the aforementioned electrical energy storage device, the rivet terminal 5 and the rivet terminal 7 are in a state where current is capable of flowing therethrough. When the pressure inside the casing 1 rises, a pressure acting on the lower surface of the second deformable plate 71 rises. On the other hand, the pressure in the space 86 sealed from the space inside the casing 1 acts on the upper surface of the second deformable plate 71. Due to this, when the difference between the pressures acting respectively on the lower surface and the upper surface of the second deformable plate 71 reaches a certain value (which in other words when the pressure inside the casing 1 exceeds a certain value), the second deformable plate 71 inverts and changes from the state of bulging out downward to the state of bulging out upward. When this happens, the air inside the space 86 moves to the space 88 through the ventilation hole 73d, and the pressure in the space 88 rises. Due to this, in the process of the second deformable plate 71 changing from its state of being bulged out downward to a state of being bulged out upward (in other words, in the process of a capacity of the space 86 being reduced), the difference between the pressure acting on the lower surface of the first deformable plate 75 and the pressure acting on the upper surface of the first deformable plate 75 (that is atmospheric pressure) becomes larger. Further, when the second deformable plate 71 is inverted, the protrusion part 83 of the second deformable plate 71 collides with the center part 73b of the breakable plate 73, and the breakable plate 73 breaks along the groove portion 73a. The first deformable plate 75 inverts by the difference between the pressures acting respectively on the upper surface and the lower surface of the first deformable plate 75 becoming larger and the collision of the protrusion part 83 of the second deformable plate 71 with the center part 73b of the breakable plate 73 by the upward displacement of the protrusion 83, and the first deformable plate 75 and the center part 73b of the breakable plate 73 are displaced upward. In other words, the breakable plate 73 and the first deformable plate 75 become electrically disconnected. Due to this, the current passage connecting the breakable plate 73 and the first deformable plate 75 is interrupted, and the current flow between the electrode assembly 3 and the rivet terminal 5 is interrupted. At this occasion, the first deformable plate 75 is insulated from the connecting terminal 23, and the breakable plate 73 is insulated from the rivet terminal 5. The formation of the ventilation hole 73d allows the air in the space 86 to move into the space 88 by flowing through the ventilation hole 73d when the second deformable plate 71 is inverted, the second deformable plate 71 can invert smoothly. According to this configuration as well, the same effects as the electrical energy storage device 100 of the first embodiment can be achieved. Notably, the aforementioned current interruption device 70 may be attached to electrical energy storage devices in other embodiments.

Fourth Embodiment

Figure 6:
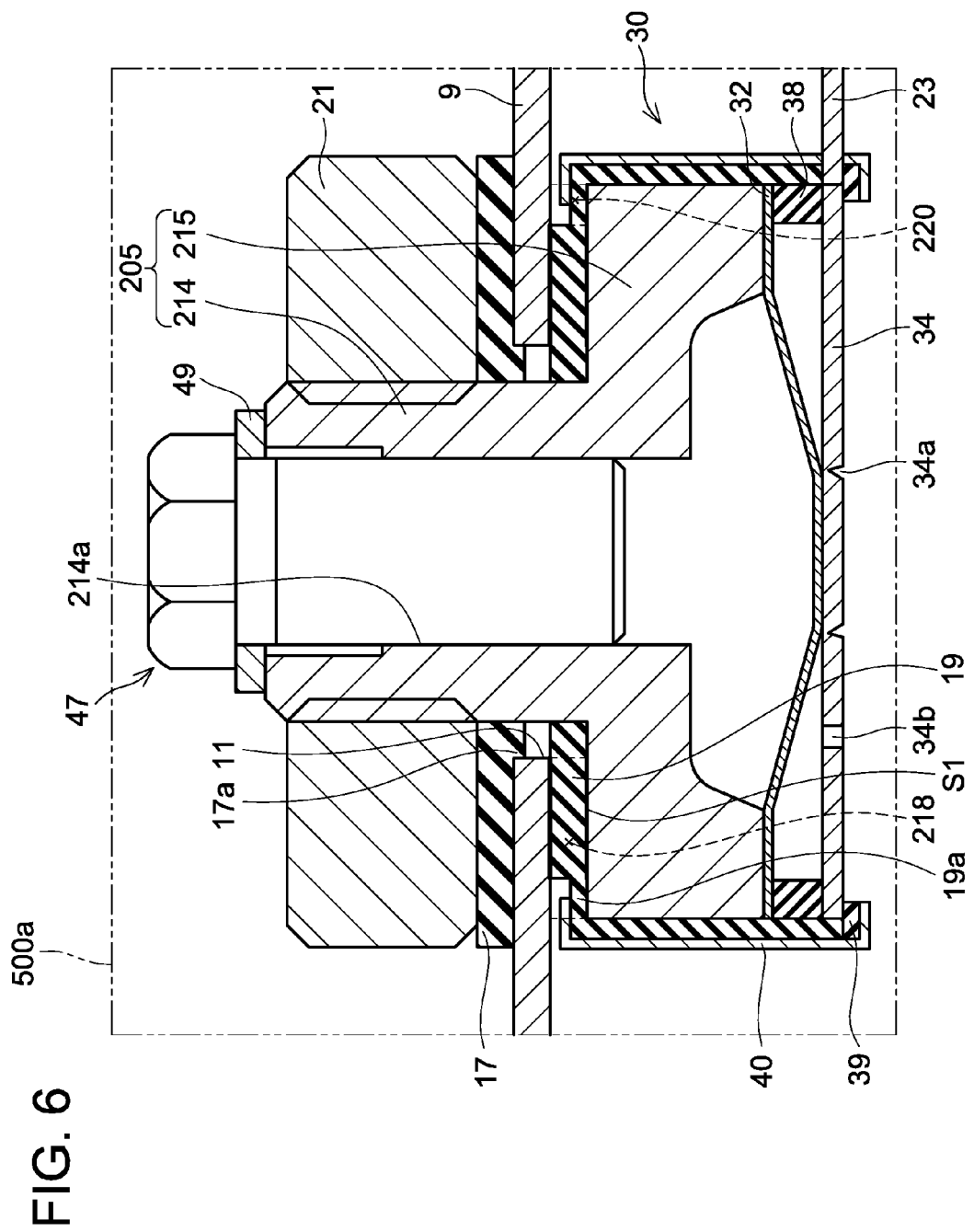
FIG. 6 is a partial enlarged view in a vicinity of a negative terminal of an electrical energy storage device of a fourth embodiment.

A two-dot chain line portion 500a of FIG. 6 corresponds to the two-dot chain line portion 200a of FIG. 1. In this electrical energy storage device, the configuration of the negative terminal 205 differs from the first embodiment. The negative terminal 205 comprises a cylindrical part 214 and a base part 215. When the negative terminal 205 is to be fixed to the casing upper wall 9, the cylindrical part 214 is inserted into the opening 11 of the casing upper wall 9 from inside the casing 1 in a state where the ring-shaped sealing member 19 and plate member 40 are inserted in the cylindrical part 214. Then, the ring-shaped insulating member 17 is attached to the cylindrical part 214 from outside the casing 1, and the insulating member 17 is brought into contact with the casing upper wall 9. Thereafter, a nut 21 is tightened onto the cylindrical part 214 from outside the casing 1. Due to this, the negative terminal 205 is fixed to the casing upper wall 9, and the sealing member 19 is clamped between the base part 215 and the casing upper wall 9. A through hole 214a is provided in the negative terminal 205 in the axial direction (up and down direction). A bus bar bolt 47 is attached to the through hole 214a. A bus bar 49 is disposed between ahead of the bus bar bolt 47 and the negative terminal 205. When the bus bar bolt 47 is attached to the through hole 214a, the bus bar 49 is clamped between the head of the bus bar bolt 47 and the negative terminal 205. Notably, the negative terminal 205 corresponds to an example of "a terminal".

The sealing member 19 makes contact with both the base part 215 and the casing upper wall 9 at the sealing portion S1, and provides sealing therebetween. A space 218 surrounded by a dotted line of FIG. 6 shows a space in a range occupied by the nut 21 within a range where the casing upper wall 9 and the base part 215 face each other when the casing upper wall 9 is seen in the plan view. As shown in FIG. 6, the sealing portion S1 is positioned within the space 218. In the space between the negative terminal 205 and the casing upper wall 9, a space 220 is provided on a casing inner side than the sealing portion S1. The space 220 has the thin portion 19a of the sealing member 19 disposed therein over an entirety in the planar direction.

A part 17a extending downward is provided at an outer periphery of an opening provided in the insulating member 17. The part 17a is fitted into the opening 11. The part 17a ensures better insulation between the negative terminal 205 and the casing upper wall 9, and the negative terminal 205 can easily be positioned thereby. A space is provided between the sealing member 19 and the part 17a.

According to this configuration as well, the same effects as the electrical energy storage device 100 of the first embodiment can be achieved. Further, according to this configuration, a direction of tightening force that the nut 21 applies onto the casing upper wall 9 and a direction of compressing force for sealing the base part 215 and the casing upper wall 9 match, as a result of which the base part 215 can strongly be sealed from the casing upper wall 9 at the sealing portion S1.

As above, various embodiments of the technique disclosed in this description have been described in detail, however, they are mere examples and the electrical energy storage device disclosed in the present description includes modifications and variants of the above embodiments. For example, the current interruption device 30 and the current interruption device 70 may be provided on a rivet terminal 7 side, or may be provided for both of the rivet terminal 5 and rivet terminal 7. Further, in the above embodiments, the electric conduction with the breakable plate 34 is interrupted by the inverting motion of the deformable plate 32. However, the way in which the deformable plate 32 deforms is not limited to inversion. For example, the breakable plate 34 may break off starting from the groove portion 34a by the center part of the deformable plate 32 being warped upward, as a result of which the electric conduction between the deformable plate 32 and the breakable plate 34 is interrupted. The deformable plate 32 may deform arbitrarily so long as the electric conduction between the deformable plate 32 and the breakable plate 34 is interrupted thereby. The same applies to the second deformable plate 75.

The embodiments have been described in detail in the above. However, these are only examples and do not limit the claims. The technology described in the claims includes various modifications and changes of the concrete examples represented above. The technical elements explained in the present description or drawings exert technical utility independently or in combination of some of them, and the combination is not limited to one described in the claims as filed. Moreover the technology exemplified in the present description or drawings achieves a plurality of objects at the same time, and has technical utility by achieving one of such objects.

The invention claimed is:

1. An electrical energy storage device comprising:
   a casing configured to accommodate electrolytic solution and an electrode assembly including a positive electrode and a negative electrode;
   a terminal configured to extend from inside of the casing to outside of the casing through an opening provided on the casing; and
   a current interruption device disposed within the casing, electrically connected to the terminal and one of the positive electrode and the negative electrode, and comprising a conductive member configured to switch the terminal and the one of the positive electrode and the negative electrode from a conductive state to a non-conductive state,
   wherein
   the terminal is provided on a terminal wall, which is one of a plurality of walls configuring the casing,
   the terminal comprises a column part inserted in the opening and a base part connected to one end of the column part and disposed within the casing,
   the base part is larger than the opening in a plan view of the terminal wall and is electrically connected to the conductive member,
   a first insulating member is disposed between the terminal and the terminal wall, the first insulating member has an insulating property and surrounds an entire periphery of the column part,
   the first insulating member comprises a sealing part sealing between the inside and the outside of the casing by being in contact with both of the terminal and the terminal wall at a sealing position, and a non-sealing part that does not provide sealing between the inside and the outside of the casing,
   the sealing position surrounds the entire periphery of the column part, and
   in an entire space provided between the terminal and the terminal wall on an inner side of the casing than the sealing position, the non-sealing part surrounds the entire periphery of the column part and is disposed from an end face in the entire space on a casing outer side to an end face in the entire space on a casing inner side, the current interruption device further comprises a breakable plate and a deformable plate, the breakable plate is electrically connected to one of the positive electrode and the negative electrode, and is electrically connected to the conductive member, the deformable plate is disposed on an opposite side from the conductive member relative to the breakable plate, an outer edge part of the deformable plate being fixed to the breakable plate, the deformable plate configured to electrically separate the breakable plate from the conductive member by deforming when a pressure within the casing rises above a predetermined level, a second insulating member is disposed between the breakable plate and the terminal, and seals between the breakable plate and the terminal, the first insulating member comprises a first part and a second part, the first part extends from an outer side toward the inner side of the casing on a surface of the base part facing the terminal wall, the second part extends from an end of the first part on the inner side of the casing to the deformable plate, and the first part and the second part are in contact with the base part.

2. An electrical energy storage device according to claim 1, wherein the terminal comprises a fixed part connected to the column part at an opposite side of a side connected to the base part of the column part, the fixed part disposed in the outside of the casing, and fixing the terminal to the terminal wall by bending outward in a direction perpendicular to an axis from the opposite side of the column part, and the sealing position is disposed in a range where the terminal and the terminal wall overlap, and that is occupied by the fixed part in the plan view of the terminal wall.

3. An electrical energy storage device according to claim 1, wherein the terminal is fixed and clamped to the terminal wall by a nut disposed on the outside of the casing, and the sealing position is disposed in a range where the terminal and the terminal wall overlap, and that is occupied by the nut in the plan view of the terminal wall.

4. An electrical energy storage device according to claim 1, wherein the base part comprises a flat part that is parallel to the terminal wall, the sealing part and the non-sealing part are disposed at positions overlapping the flat part in the plan view of the terminal wall.

5. An electrical energy storage device module comprising a plurality of the electrical energy storage devices according to claim 1, wherein the electrical energy storage devices are connected in series.

6. An electrical energy storage device comprising:

a casing configured to accommodate electrolytic solution and an electrode assembly including a positive electrode and a negative electrode;

a terminal configured to extend from inside of the casing to outside of the casing through an opening provided on a terminal wall of the casing; and a current interruption device disposed within the casing, electrically connected to the terminal and one of the positive electrode and the negative electrode, and comprising a conductive member configured to switch the terminal and the one of the positive electrode and the negative electrode from a conductive state to a non-conductive state, wherein the terminal comprises a column part inserted in the opening and a base part connected to one end of the column part and disposed within the casing, the base part is larger than the opening in a plan view of the terminal wall and is electrically connected to the conductive member, an insulating seal member is disposed between the terminal and the terminal wall, the insulating seal member sealing between the inside and the outside of the casing by being in contact with both of the terminal and the terminal wall at a sealing position, and surrounding an entire periphery of the column part, and the sealing position is disposed at least on an end face on a casing inner side in a space disposed between the terminal and the terminal wall, the current interruption device further comprises a breakable plate and a deformable plate, the breakable plate is electrically connected to one of the positive electrode and the negative electrode, and is electrically connected to the conductive member, the deformable plate is disposed on an opposite side from the conductive member relative to the breakable plate, an outer edge part of the deformable plate being fixed to the breakable plate, the deformable plate configured to electrically separate the breakable plate from the conductive member by deforming when a pressure within the casing rises above a predetermined level, an insulating member is disposed between the breakable plate and the terminal, and seals between the breakable plate and the terminal, the insulating seal member comprises a first part and a second part, the first part extends from an outer side toward an inner side of the casing on a surface of the base part facing the terminal wall, the second part extends from an end of the first part on the inner side of the casing to the deformable plate, and the first part and the second part are in contact with the base part.

7. An electrical energy storage device according to claim 6, wherein the terminal comprises a fixed part connected to the column part at an opposite side of a side connected to the base part of the column part, the fixed part disposed in the outside of the casing, and fixing the terminal to the terminal wall by bending outward in a direction perpendicular to an axis from the opposite side of the column part, and the sealing position is disposed in a range where the terminal and the terminal wall overlap, and that is occupied by the fixed part in the plan view of the terminal wall.

8. An electrical energy storage device according to claim 6, wherein the terminal is fixed and clamped to the terminal wall by a nut disposed on the outside of the casing, and the sealing position is disposed in a range where the terminal and the terminal wall overlap, and that is occupied by the nut in the plan view of the terminal wall.

9. An electrical energy storage device module comprising a plurality of electrical energy storage devices according to claim 6,
wherein the plurality of electrical energy storage devices are connected in series.

* * * * *